(12) United States Patent
Jones

(10) Patent No.: US 7,182,561 B2
(45) Date of Patent: Feb. 27, 2007

(54) BLIND RIVET WITH STEAL

(75) Inventor: Steven V. Jones, Birmingham (GB)

(73) Assignee: Newfrey LLC, Newark, DE (US)

( * ) Notice: Subject to any disclaimer, the term of this patent is extended or adjusted under 35 U.S.C. 154(b) by 0 days.

(21) Appl. No.: 10/496,705

(22) PCT Filed: Dec. 7, 2002

(86) PCT No.: PCT/EP02/13885

§ 371 (c)(1),
(2), (4) Date: May 25, 2004

(87) PCT Pub. No.: WO03/052282

PCT Pub. Date: Jun. 26, 2003

(65) Prior Publication Data

US 2005/0019136 A1   Jan. 27, 2005

(30) Foreign Application Priority Data

Dec. 14, 2001 (GB) ................................ 0129936.1

(51) Int. Cl.
*F16B 19/10* (2006.01)
(52) U.S. Cl. .............................. 411/43; 411/82; 411/45
(58) Field of Classification Search ................ 411/41, 411/45, 34, 82–82.3, 930, 903, 914, 43
See application file for complete search history.

(56) References Cited

U.S. PATENT DOCUMENTS

| 2,326,455 | A | * | 8/1943 | Gray | ........................... 411/504 |
| 2,724,303 | A | * | 11/1955 | Holcomb | ..................... 411/439 |
| 3,403,593 | A | * | 10/1968 | Moore | ........................... 411/29 |
| 3,469,490 | A | | 9/1969 | Pearce, Jr. | |
| 3,472,301 | A | | 10/1969 | Pearce, Jr. | |
| 3,639,137 | A | * | 2/1972 | Marinelli | .................. 428/321.5 |
| 3,772,957 | A | | 11/1973 | Newton | |
| 4,102,030 | A | | 7/1978 | King, Jr. | |
| 4,388,031 | A | * | 6/1983 | Rodgers | ........................ 411/43 |
| 4,659,268 | A | * | 4/1987 | Del Mundo et al. | ............ 411/34 |
| 4,859,128 | A | * | 8/1989 | Brecz et al. | .................... 411/43 |
| 4,987,714 | A | * | 1/1991 | Lemke | ............................ 52/410 |
| 5,375,953 | A | * | 12/1994 | Krug et al. | ..................... 411/43 |

FOREIGN PATENT DOCUMENTS

| EP | 1052416 A1 | 11/2000 |
| GB | 01299361 | 3/2002 |
| WO | PCT/EP 02/13885 | 2/2003 |

* cited by examiner

*Primary Examiner*—Flemming Saether
(74) *Attorney, Agent, or Firm*—Ajay K. Gambhir; Edward D. Murphy

(57) ABSTRACT

An open-end blind rivet (210) comprises a headed mandrel (218) with a substantially tubular rivet mounted thereon with a flowable sealant (250) disposed between the mandrel and the rivet whereby setting of the blind rivet compresses the sealant between the head (216) of the mandrel and an inner surface of the rivet to form a seal therebetween.

23 Claims, 3 Drawing Sheets

US 7,182,561 B2

BLIND RIVET WITH STEAL

BACKGROUND OF THE INVENTION

This invention relates to tubular rivets of the type usually used for holding together two or more sheets of material. More particularly, this invention is directed to an open end blind rivet of the type having a first flange at one end of the rivet body and utilising a headed mandrel to deform the opposed end of the rivet body to compress the sheet material between the flange of the rivet body and its deformed end.

Open end blind rivets are well known and notably those sold under the applicants trade mark POP® (registered trade mark of Emhart Inc.) as a conventional fixing mechanism for holding together two or more sheets of material. This type of blind rivet comprises of a hollow, tubular rivet body having a large flange towards one end thereof to engage with one side of a sheet material, whereby the opposed end of the tubular rivet body is passed through a preformed hole. The rivet further comprises a headed mandrel which extends through the hollow tubular rivet body with its head engaging the opposed end thereof. During setting of the blind rivet the head of the mandrel compresses the opposed end of the rivet body which is deformed towards the flange of the rivet body, to compress the sheet material therebetween. The mandrel will further comprise a weakened shank in the region of the mandrel head with a pre-determined break load allowing the mandrel to be removed from the set rivet when sufficient load is applied. This provides for a simple and inexpensive fasting means that can be applied manually and set with a suitable rivet setting tool to hold together two or more sheets of material. It is generally understood that whilst the mandrel head is drawn into the rivet, to deform the rivet when set, such engagement between the rivet head and the rivet is not airtight nor waterproof. The mandrel head is often free to move within the deformed portion of the set rivet and can occasionally be found to "rattle" within the set rivet.

Alternatively, where blind rivets are required to create a watertight or airtight seal, closed-end (or sealed) blind rivets are employed. Such closed-end blind rivets are similar to open-end blind rivets but instead of the head of the mandrel being disposed externally of a hollow tubular rivet body, the headed mandrel is retained within a closed cup shaped cylindrical tube so as to be encapsulated within the rivet body such that the rivet body has a closed end.

However, the manufacture of closed-end blind rivets is comparatively more complex and expensive whereby the large mandrel head is first received in a cup shaped preform, the resulting subassembly extruded to encapsulate the mandrel within the body of the rivet and simultaneously form the rivet body flange. Not only is this process more expensive but requires a high degree of tooling accuracy and manufacturing skill to prevent damage to the mandrel and the associated manufacturing tooling. A further drawback to this type of manufactured blind rivet is a limitation to the length of the rivet body and/or the length of the mandrel that can be made on current manufacturing machinery and if suitable machinery were available the cost of that machinery plus the attendant slowness of the process would render the resulting closed end rivet prohibitively expensive.

It is so often desirable to use closed-end rivets in situations where airtight or watertight joints are required. However, where such rivets are required to secure thick workpieces or where the rivet is inserted into narrow recesses or channels difficulties can arise due to the limitation of the length of the rivet body or the length of the mandrel thus restricting the applicability of closed-end rivets in such applications. Conventional setting tools for blind rivets to be set in deep and narrow recesses require a relatively long mandrel in order to grip and set the rivet. Thus current technology does not provide for blind rivets capable of application in deep narrow recesses or thick joints and being able to consistently achieve a watertight or airtight seal.

It is therefore an object of the present invention to alleviate the aforementioned problems and to provide an open-end blind rivet capable of providing an airtight or watertight seal when set.

SUMMARY OF THE INVENTION

According to the present invention there is provided an open-end blind rivet comprising a mandrel with a mandrel head and a rivet body mounted on the mandrel, having a flowable sealant disposed between the mandrel and the rivet body, whereby the setting of the blind rivet compresses the sealant between the head of the mandrel and an inner surface of the rivet body to form a seal there between.

Preferably the flowable sealant will comprise an adhesive material which may be or alternatively may comprise of an epoxy resin, usually a heat curable micro encapsulated epoxy resin. Preferably, the epoxy resin may comprise a two part epoxy resin system, usually in a micro encapsulated form or a micro encapsulated epoxy acrylate based system.

Alternatively, the sealant may comprise of a resilient flowable material such as plastic or rubber which under compressive forces is able to flow about the head of the mandrel.

It is preferred that at least one of the shank of the mandrel or the mandrel head itself is encapsulated by the flowable sealant. In this preferred embodiment it is envisaged that the flowable sealant will completely encircle the shank of the mandrel and/or will completely encompass the mandrel head.

BRIEF DESCRIPTION OF THE ACCOMPANYING DRAWINGS

A preferred embodiment of the present invention will now be described, by way of example only, with reference to the accompanying illustrative drawings in which.

DETAILED DESCRIPTION OF THE INVENTION

Figure 1:
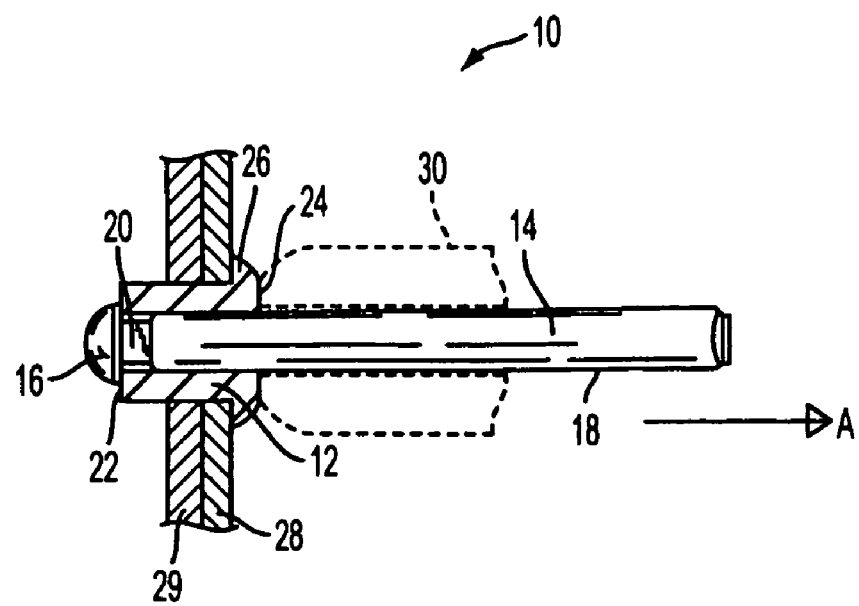
FIG. 1 is a sectional view of an conventional open-end blind rivet.

Referring now to FIG. 1, a conventional open-end blind rivet 10 comprises a substantially hollow tubular rivet body 12 and an associated mandrel 14. The mandrel is substantially an elongate cylindrical metal wire (although alternative embodiments for plastics rivets could employ plastics mandrels) having disposed at one end and coaxial therewith, a mandrel head 16 having a diameter greater than the mandrel wire. Disposed between the main body 18 of the mandrel 14 and the mandrel head 16 is a mandrel shank 20, again coaxial with body 18 but having a diameter less than then the diameter of the body 18. Thus the mandrel shank provides a narrowed neck portion of the mandrel as clearly seen in FIG. 1.

The cylindrical rivet body 12 has an inner diameter substantially equal to the diameter of the mandrel body 18 whereby the mandrel 18 can be fed through the rivet body 12 (in a direction substantially shown by arrow A in FIG. 1) until the head 16 engages with an end surface 22 of the rivet body 12, and is held by frictional engagement between the inner surface of the rivet body 12 and the mandrel body 18 in this desired configuration. The mandrel head 16 has a diameter less than the outer diameter of the rivet body. At a second end 24 of the rivet body 12 opposed to the end surface 22, the tubular rivet body has formed thereon a substantially cylindrical flange 26.

In use, the open-end blind rivet 10 is often used to hold together two pieces of sheet material ie. sheet metal (28 and 29) by firstly drilling a hole through both sheets 28 and 29 having a diameter substantially equal to or similar to that to the outer diameter of the rivet body 12. When looking at FIG. 1, the rivet body 12 may then be inserted from right to left by passing the rivet body and the mandrel head through the hole formed in the sheets 28 and 29 to the position shown in FIG. 1 whereby the flange 26 engages with sheet 28 to define the insertion limit.

A conventional blind rivet setting tool is then employed to actually set the rivet into a deformed engaged configuration. This conventional setting tool (illustrated systematically by use of dotted lines 30 in FIG. 1) is well understood in the art and will not be described in great detail here save to explain its function. The setting tool has an outer sleeve member 30, which will engage with the outer surface of the flange 26, and an mandrel gripping and pulling jaws (not shown) which engages the mandrel body 18. In operation, the inner clamping mechanism displaces the mandrel body 18 in the direction shown by arrow A (FIG. 1) whilst the sleeve 30 restrains the rivet 12 from such displacement. This effectively draws the mandrel head inwardly of the rivet body 12 in the direction A whilst restraining the flange of the rivet body 12 against the sheet metal to be secured. In this manner it will be appreciated that the large diameter flange mandrel head 16 deforms and expands the end 22 of the rivet body 12 against the sheet metal 29 effectively clamping the sheet metal 28 and 29 between the flange 26 and the deformed end 221 of the rivet body 12 (this deformation 221 is shown substantially in FIG. 3).

In addition, since the mandrel shank 20 is of a smaller diameter than the mandrel body 18 this forms a weakened portion of the mandrel which will break under a predetermined load which allows the mandrel to snap in this region to leave the mandrel head 16 disposed within the deformed rivet body 12 and removing the mandrel body 18 out of and away from the rivet body 12 leaving a clean fixing member.

In practice the mandrel of the rivet assembly 10 is inserted into a setting tool and as its pulling jaws apply a traction load to the mandrel 18 this load is transferred to the rivet body 12 and is supported along its axis. As the setting loading increases the rivet body shortens, workpiece plates are pulled together and workpiece initial hole filling takes place. It is apparent, however, that as the pulling load increases there is a limit to the load that the end of the rivet body 12 can support. When this limit is reached the head 16 of the mandrel then enters the rivet body, expands and deforms the rivet body and progresses within the rivet body until it reaches the proximity of the side of the workpiece. Progress of the mandrel through the rivet body stops although the setting load increases until it reaches the predetermined break-load load of the mandrel. The mandrel breaks and as it does so there is a release of strain energy which has the effect loosening the remaining part of the mandrel, notably its head 16. It is also a characteristic that, due to the work carried out in the permanent deformation from shortening of the rivet body and its blind side radial expansion, there is heat generated that raises the temperature of the rivet body and the mandrel head that remains inside the rivet body.

It is generally understood, therefore, that whilst the mandrel head 16 is drawn into the rivet body 12 to deform and set the rivet such engagement of the mandrel head within the rivet body does not necessarily render the rivet airtight or watertight.

Figure 3:
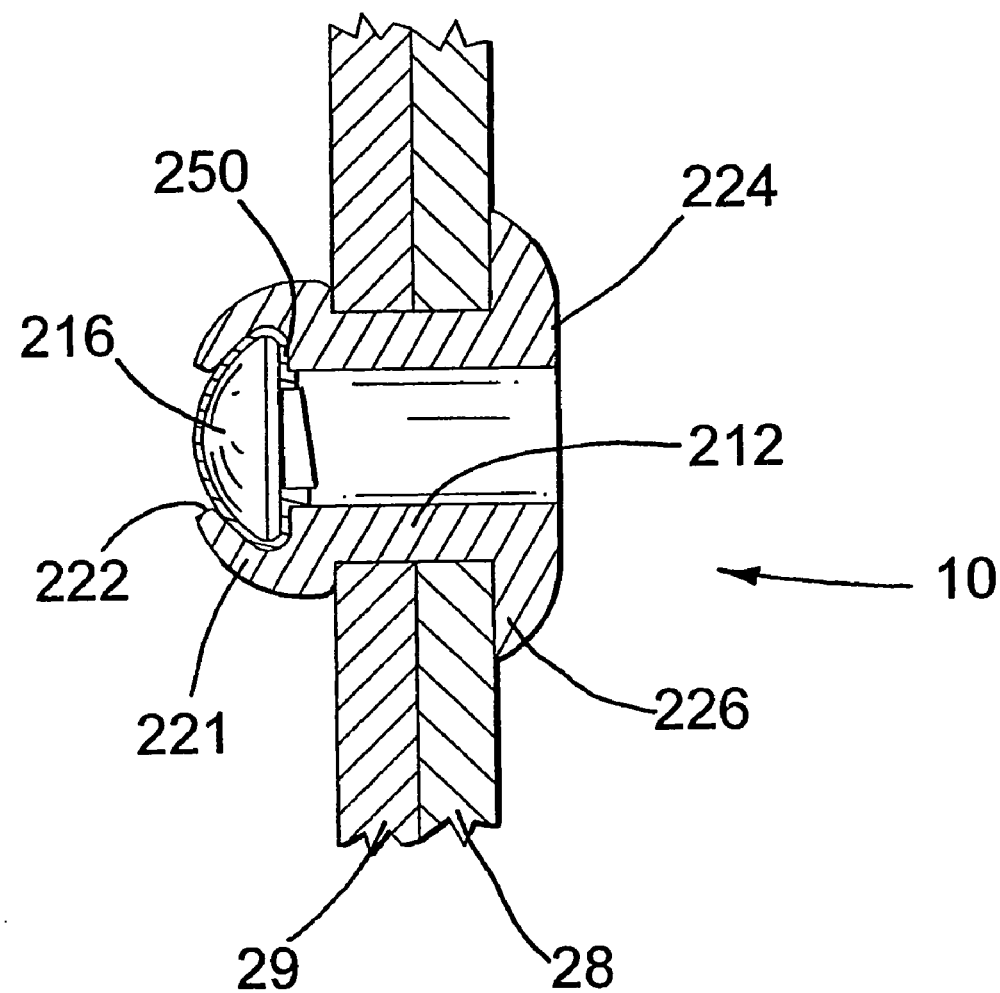
FIG. 3 is a sectional view of the blind rivet of FIG. 2 in a set configuration.

FIG. 3 does not correspond to the conventional open-end blind rivet of FIG. 1 because FIG. 3 includes elements of an embodiment of the present invention. FIG. 3 is referred to in this paragraph to illustrate an open end set blind rivet. The set blind rivet as shown in FIG. 3 has mandrel removed and the mandrel head 216 restrained within the deformed end 221 of the rivet, the deformed end 221 of the rivet applying a compression force on the sheet metal 28 and 29 disposed between it and the shank 226 to form a secure fastening element. However, in a conventional set blind rivet even though the mandrel head has been retained inwardly of the rivet body in the deformed configuration, the retention of the mandrel head does not necessarily form an airtight or watertight seal and quite often within this deformed portion the mandrel head is able to move slightly which can result in "rattling" as the mandrel head moves within the set rivet. This is undesirable, particularly where these types of rivets are used in motor vehicles or other applications where vibrations are common place. In addition, since these conventional fastenings are unable to provide watertight or airtight seals their application is limited to those environments where such watertight seals are not required.

Figure 4A:
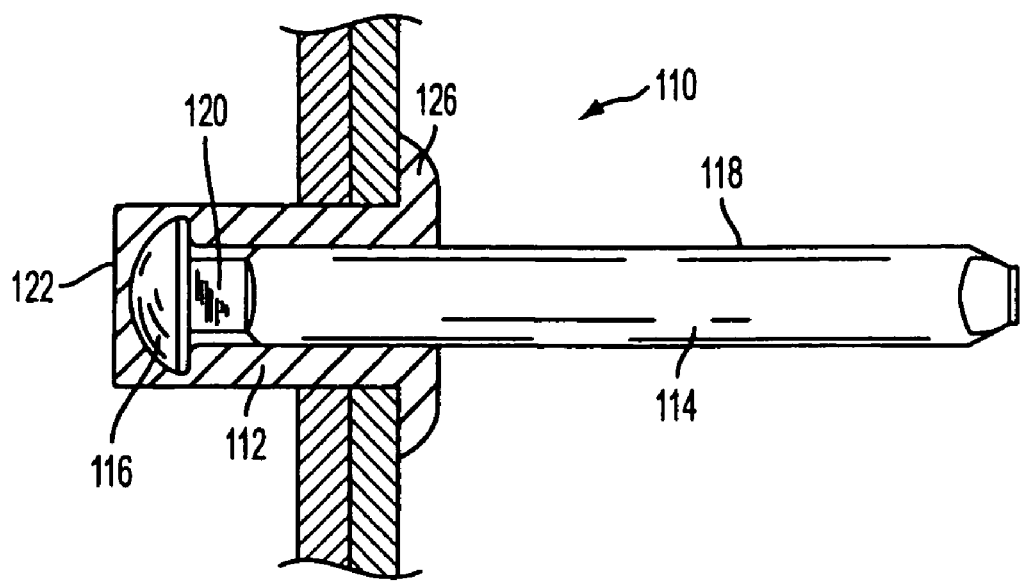
FIG. 4*a* is a sectional view of a conventional closed-end blind rivet.
Figure 4B:
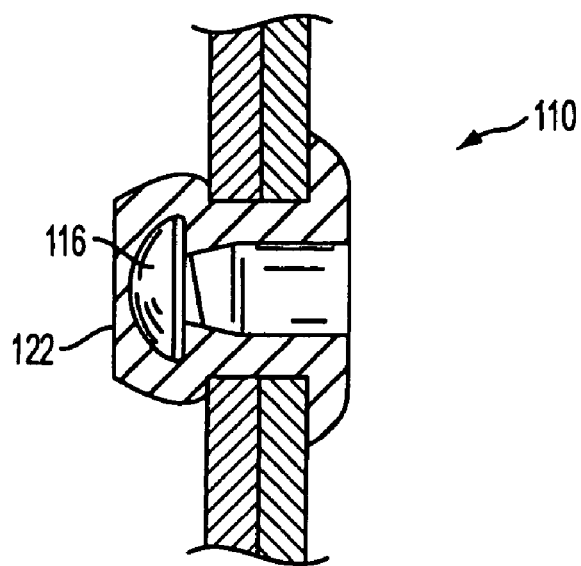
FIG. 4*b* is a sectional view of the blind rivet of FIG. 4*a* in a set configuration.

FIGS. 4a and 4b show an alternative type of blind rivet, notably a closed-end blind rivet 110 which is very similar to the opened-end blind rivet shown in FIG. 1. The closed-end blind rivet 110 comprises a substantially tubular rivet body 112 having a first closed-end 122 and having an external flange 126 at the opposed end. In this manner, as seen in FIG. 4a, the rivet body 112 is substantially cup shaped as opposed to hollow tubular as shown in FIG. 1. In addition, the blind rivet 110 in FIG. 4a also comprises a mandrel 114 having a head 116 and associated shank 120 whereby the head 116 is retained in an inner position of the rivet body 112. As can be seen in FIG. 4a, the mandrel and mandrel head are again coaxial with the rivet whereby the mandrel head has a diameter greater than the internal diameter of the rivet body 112. This is achieved by the manufacturing process of such a closed-end blind rivet 110 whereby firstly a cup shaped rivet is formed having an internal diameter substantially equal to the diameter of the mandrel head 116 which is inserted therein. The entire rivet with inserted mandrel is then passed through a constriction die to substantially reduce the overall diameter of the rivet and as the rivet is passed through such a narrowed die, the gradual constriction of the rivet diameter, as such rivet is fed longitudinally through the die, serves to force the mandrel head to the inner position shown in FIG. 4a. In this manner, a narrowed rivet body 112 is created housing a mandrel head with a larger diameter.

Such manufacturing techniques are well known and will not be described further. The closed-end surface 122 of the rivet is substantially thinner than the rivet side walls, but serves to form a sealed end unit.

This closed-end blind rivet is utilised in a manner identical to that previously described with reference to the open-end blind rivet, whereby the setting tool again restrains displacement of the rivet body 112 as the mandrel is displaced from left to right as viewed in FIG. 4a. In this manner the mandrel head 116 engages the constricted inner walls of the rivet body 112 so as to deform the remote end of the rivet body 112, thereby again compressing the metal sheets held there between. In this way the rivet 112 deformed to the set configuration shown in FIG. 4b whereby the mandrel body 118 is broken off once the rivet has been set. Alternatively it will also be appreciated that the mandrel shank portion 120 can be omitted from the mandrel 114 whereby once the mandrel has been used to set the closed-end blind rivet the mandrel body 118 remains in place projecting proud of the set rivet 110. This can serve a useful purpose for providing an electrical connection where such rivets are used in printed circuit boards etc. However, in either case it is clearly seen that the closed-end 122 of the rivet body 112 provides a sealed end to the set rivet 122, providing an airtight and watertight fastening. It will be appreciated that the shank portion of open-end blind rivet 10 can also be omitted so that the mandrel is left in place after setting of the rivet 10 if so desired.

Due to the need to insert the mandrel head 114 into the rivet body 112 of the closed-end blind rivet 110 during its construction, this requires high manufacturing tolerances and restriction on the length of the mandrel that may be employed, since it must be fed into the rivet in one direction only. Compare the open-end blind rivet 10 of FIG. 1, whereby it is appreciated that there is no limitation on the length of the mandrel body 18 which is fed through the blind rivet 10 until the mandrel head 16 engages the rivet body itself in the final constructed position. Known manufacturing techniques and equipment for closed and blind rivets limit the mandrel length that may be employed, thus limiting the potential application of this type of rivet which cannot be used in deep narrow passages, where the setting tool is unable to grip a "shorter" mandrel.

Figure 2:
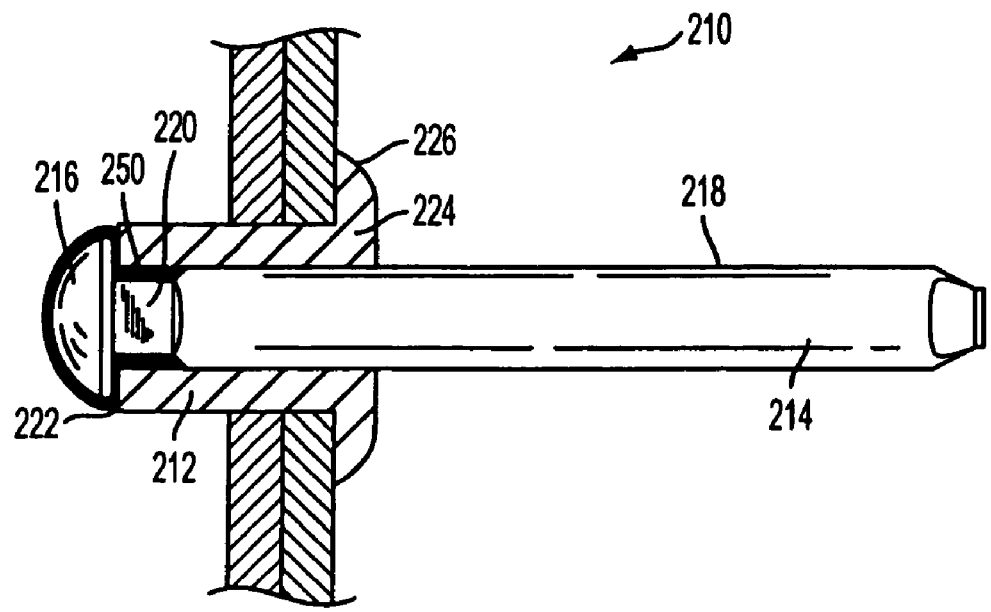
FIG. 2 is a sectional view of an open-end blind rivet according to the present invention.

Referring now to FIG. 2, an open-end blind rivet 210 according to the present invention is shown. This blind rivet 210 is substantially identical to that shown in FIG. 1 for blind rivet 10 whereby similar reference numerals for identical feature found between rivet 10 and rivet 210 will now be used with reference to FIG. 2 with the inclusion of a prefix "2" to identify similar parts. In this manner it is appreciated that the only difference between the open end blind rivet shown in FIG. 2 and that shown in FIG. 1 is the inclusion of a flowable sealant material 250 (which is shown as black) encapsulating both the mandrel head 216 and mandrel shank 220. In a preferred embodiment, this flowable sealant will comprise an adhesive material or product and most notably is a micro encapsulated epoxy resin (such as a two part epoxy resin system, usually in a micro-encapsulated form, or a micro encapsulated epoxy acrylate based system) which may be heat cured. An example of a commercially available micro encapsulated epoxy resin is sold under the trade name Scotchgrip 2353. However, such epoxy resins are well known and readily available from adhesive manufacturers. It will also be appreciated that alternative forms of flowable medium may be employed as a sealant in the current invention, notably commercially available adhesive materials or, alternatively, flowable resilient materials such as plastics or rubber.

On setting of the open-end blind rivet 210 the mandrel is again displaced in the direction of Arrow A, FIG. 1, to compress the mandrel head against end 222 of the rivet body 212 so as to deform the rivet in a manner previously described and as now shown in FIG. 3. It will be appreciated that as the mandrel head 216 is drawn into the end region 222 of the rivet body 212 the sealant material 250 is also compressed between the rivet body 212 and the mandrel head 216 to flow thereabout and occupy any gaps or spaces between the rivet and mandrel head and to form a substantially uniform seal therebetween. In particular, the pressure created by drawing the head into the rivet body 212 causes the micro capsules within the two part system to rupture and to provide a catalyst that activates the resin. With the pressure of the mandrel being drawn into the rivet body the activated resin sealant is forced to flow and fill cavities between the mandrel and the rivet body and to further provide an adhesive bond therebetween at the set end of the rivet. The resin based system is then allowed to cure but in practice due to the heat generated in deforming the rivet body this curing action is accelerated thus providing an appropriate seal necessary to prevent water and gas ingress through the rivet 210.

Where a flowable medium such as rubber or plastic is used as a sealant, again the large compressive forces between the rivet body 212 and mandrel body 218 and mandrel head 216 will create a substantially fluid flow of this resilient material in a similar manner to a liquid flow.

Adhesive materials are preferred for use in this particular invention and notably the epoxy resins since they not only solidify to form an appropriate seal but solidification of these adhesive materials also helps provide an additional bond between the mandrel head and the deformed rivet body 212.

A further advantage of the use of the flowable sealant is that since the material has flowed so as to occupy any spaces or cavities around the mandrel head 216 set within the deformed rivet body 212, the mandrel head 216 is restrained from displacement or movement within the set rivet and thus alleviates rattling. Furthermore it is a feature of these types of epoxy based systems that they continue to give good sealing and adhesive properties over a wide range of temperatures as in the case of the above cited Scotchgrip 2353 the range is between −60 and +150° C.

Whilst the embodiment shown herein utilises a mandrel 214 having a mandrel shank 220, with the flowable sealant disposed thereabout to surround the shank, it will be appreciated that the mandrel shank can be omitted (as previously described), provided that the mandrel head 216 is substantially encapsulated in the flowable medium to provide sufficient flowable medium so as to flow about the mandrel head in order to fill all the cavities between the head 216 and rivet body 212.

The flowable sealant will be formed about the mandrel itself prior to insertion of the mandrel into the rivet body 212. However, it is also provided that the sealant itself could be disposed within the rivet body 212 prior to the insertion of the mandrel, particularly when the rivet body has, in the end region 222, an inner diameter greater than the main inner diameter of the rivet body to provide a "well" of sealant material to be engaged by and compressed by the mandrel head 216 during setting of the rivet. It is also appreciated that there is no limitation to the type of adhesive or flowable medium that may be used, provided that such flowable medium may be substantially solidified after setting of the blind rivet to form a permanent seal between the mandrel head and rivet body.

What is claimed is:

1. A blind rivet comprising:
   (a) a mandrel with a mandrel head and shank, the shank having a substantially smooth outer surface;
   (b) a rivet body mounted on said mandrel,
   (c) a flowable sealant disposed between said mandrel and said rivet body, whereby the setting of said blind rivet compresses the sealant between the head of said mandrel and an inner surface of said rivet body to form a seal therebetween and the sealant completely encapsulates the mandrel head.

2. The blind rivet of claim 1, wherein said flowable sealant comprises an adhesive.

3. The blind rivet of claim 1, wherein the sealant comprises an epoxy resin.

4. The blind rivet of claim 1, wherein the sealant comprises a heat curable micro encapsulated epoxy resin.

5. The blind rivet of claim 3, of wherein said epoxy resin comprises a two part micro encapsulated epoxy acrylate resin system.

6. The blind rivet of claim 1, wherein said sealant comprises a resilient material.

7. The blind rivet of claim 1, wherein a portion of the mandrel defines a breakneck portion having a square shaped cross section.

8. The blind rivet of claim 1, wherein the mandrel head is configured to be surrounded in part by the inner surface of the rivet body upon setting.

9. The blind rivet of claim 1, wherein a portion of said rivet body is configured such that upon setting said portion wraps around and contacts said mandrel head.

10. The fastener of claim 1, wherein an end of the rivet body located proximate the mandrel head is configured to be open prior to mandrel insertion.

11. A fastener, comprising:
    (a) a body portion;
    (b) a mandrel having a head and a shank, the shank having a substantially smooth outer surface, the mandrel head configured to be disposed within the body portion; and
    (c) a sealing substance completely encapsulating the head, whereby the sealing substance provides a seal between the mandrel and the body portion.

12. The fastener of claim 11, wherein a portion of the mandrel is square shaped in cross section.

13. The fastener of claim 12, wherein the sealing substance is an epoxy resin.

14. The fastener of claim 13, wherein the epoxy resin is a two part epoxy resin in a micro-encapsulated form.

15. The fastener of claim 13, wherein the epoxy resin is acrylate based.

16. The fastener of claim 11, wherein a distal end of said body portion is configured such that upon setting said distal end wraps around and contacts said mandrel head.

17. The fastener of claim 11, wherein an end of the body portion located proximate the mandrel head is configured to be open prior to mandrel insertion.

18. A blind rivet for holding together two or more sheets of material, the blind rivet comprising:
    (a) a rivet body defining a flange and a bore, the flange configured to rest against a first sheet of material;
    (b) a mandrel, the mandrel including a mandrel shank disposed within the bore, a mandrel head proximate a second sheet of material;
    (c) an adhesive disposed on the mandrel and the rivet body whereby the mandrel and rivet body are configured such that upon setting the bore surrounds a portion of the mandrel head and the adhesive completely encapsulates the mandrel head to prevents the mandrel head from moving with respect to the mandrel body.

19. The fastener of claim 18, wherein the adhesive is an epoxy resin.

20. The fastener of claim 18, wherein the adhesive is a two part epoxy resin in a micro-encapsulated form.

21. The fastener of claim 18, a portion of the mandrel is square shaped in cross section.

22. The fastener of claim 18, wherein after setting a portion of the rivet body wraps around the adhesive and the mandrel head.

23. A fastener, comprising:
    (a) a rivet body defining a flange and a bore inner surface;
    (b) a mandrel head, the mandrel head movable between a first position and a second position; and
    (c) a sealing substance completely encapsulating the mandrel head, whereby the sealing substance provides a seal between the mandrel head and the body portion;
    (d) wherein the sealing substance is configured to be disposed between the mandrel head and the bore inner surface when the mandrel head is in the second position.

* * * * *